United States Patent
Liang et al.

(10) Patent No.: US 9,152,016 B2
(45) Date of Patent: Oct. 6, 2015

(54) IMAGE CAPTURING DEVICE AND METHOD FOR DETERMINING CORRECTION COEFFICIENT OF AUTOFOCUS FUNCTION

(71) Applicant: HON HAI PRECISION INDUSTRY CO., LTD., New Taipei (TW)

(72) Inventors: Ho-Kai Liang, New Taipei (TW); Yu-Han Chen, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 24 days.

(21) Appl. No.: 14/109,851

(22) Filed: Dec. 17, 2013

(65) Prior Publication Data

US 2014/0313396 A1   Oct. 23, 2014

(30) Foreign Application Priority Data

Apr. 19, 2013 (TW) .............................. 102113880 A

(51) Int. Cl.
*G03B 13/36* (2006.01)
*H04N 5/232* (2006.01)

(52) U.S. Cl.
CPC ............ *G03B 13/36* (2013.01); *H04N 5/23212* (2013.01); *H04N 5/23216* (2013.01)

(58) Field of Classification Search
CPC ................................................. H04N 5/23212
USPC .......................................... 348/345, 351, 357
See application file for complete search history.

(56) References Cited

U.S. PATENT DOCUMENTS 8,711,272 B2 * 4/2014 Noto et al. .................... 348/345
2009/0268078 A1 * 10/2009 Miyazaki et al. ............. 348/345

* cited by examiner

*Primary Examiner* — Tuan Ho
(74) *Attorney, Agent, or Firm* — Novak Druce Connolly Bove + Quigg LLP

(57) ABSTRACT

An image capturing device includes a lens, a motor to move the lens, and a variety of modules. The variety of modules includes an interface control module, a module to control the lens movement, a determining module, and an analyzing module. The interface control module displays an input interface for inputting control data. The determining module determines an actual position of the lens according to the basic autofocus function. The analyzing module calculates an optimal autofocus position for the control data input, and determines a ratio between the actual position of the lens and the optimal autofocus position as a correction coefficient. When in use, after the correction coefficient has been set, the input control data is firstly modified according to the correction coefficient, and the lens is moved by the actuator to a modified autofocus position according to the corrected control data.

16 Claims, 4 Drawing Sheets

IMAGE CAPTURING DEVICE AND METHOD FOR DETERMINING CORRECTION COEFFICIENT OF AUTOFOCUS FUNCTION

BACKGROUND

1. Technical Field

The present disclosure relates to image capturing devices, and particularly to an image capturing device and a method for correcting an autofocus function.

2. Description of Related Art

Autofocus technology is widely used in image capturing devices to capture high-quality images. Therefore, it is desirable to provide a method for how to determine a correction efficient for autofocus function, to allow the image capturing devices to reach or achieve more precise autofocus positions.

BRIEF DESCRIPTION OF THE DRAWINGS

Many aspects of the present disclosure should be better understood with reference to the following drawings. The modules in the drawings are not necessarily drawn to scale, the emphasis instead being placed upon clearly illustrating the principles of the present disclosure. Moreover, in the drawings, like reference numerals designate corresponding portions throughout the views.

DETAILED DESCRIPTION

Figure 1:
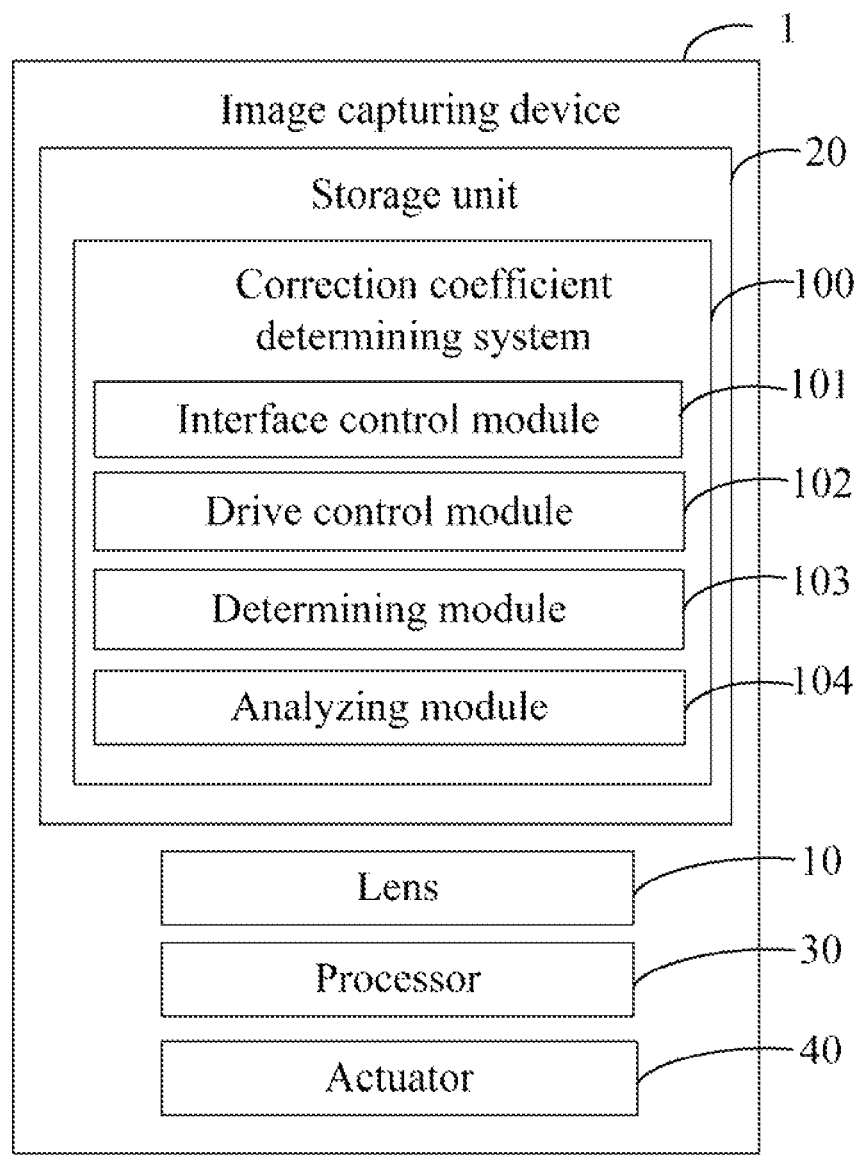
FIG. 1 is a block diagram of an image capturing device, in accordance with an exemplary embodiment.

FIG. 1 is a block diagram of an image capturing device 1 according to an exemplary embodiment. The image capturing device 1 includes a lens 10, an actuator 40 (e.g., a motor) to move the lens 10 to an autofocus position, a storage unit 20, and a processor 30. The storage unit 20 stores a correction coefficient determining system 100. The system 100 includes a variety of modules executed by the processor 30 to provide the functions of the system 100. A description of the variety of modules will be given.

In the embodiment, the system 100 includes an interface control module 101, a drive control module 102, a determining module 103, and an analyzing module 104.

Figure 2:
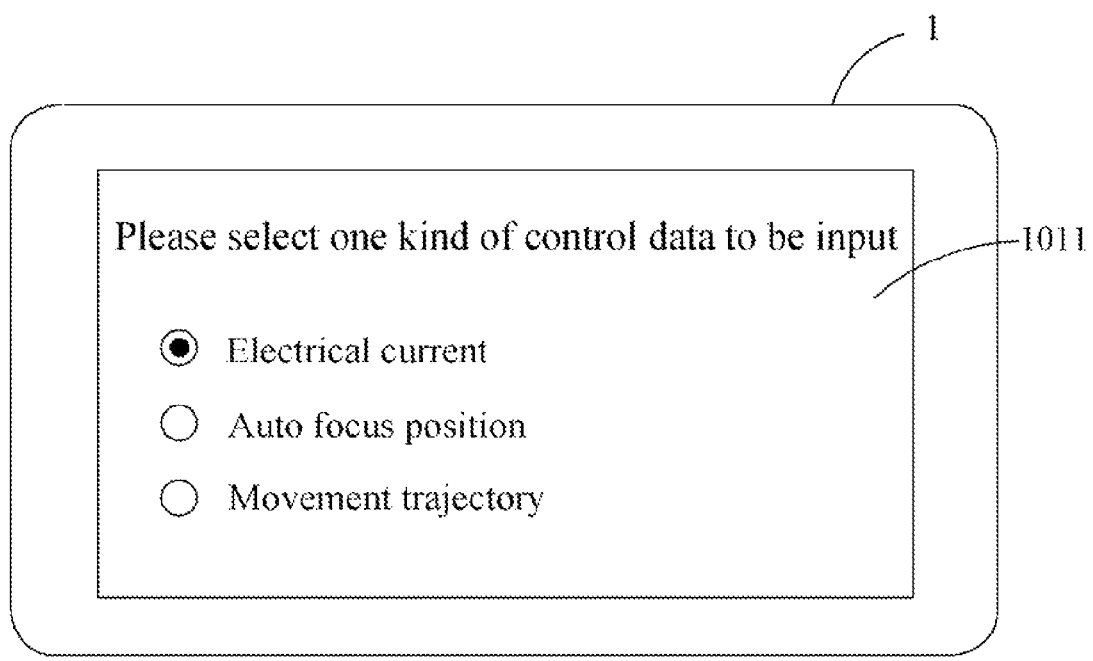
FIG. 2 is a schematic view of a selecting interface provided by the image capturing device of FIG. 1, showing a selection of one kind of control data to be input.
Figure 3:
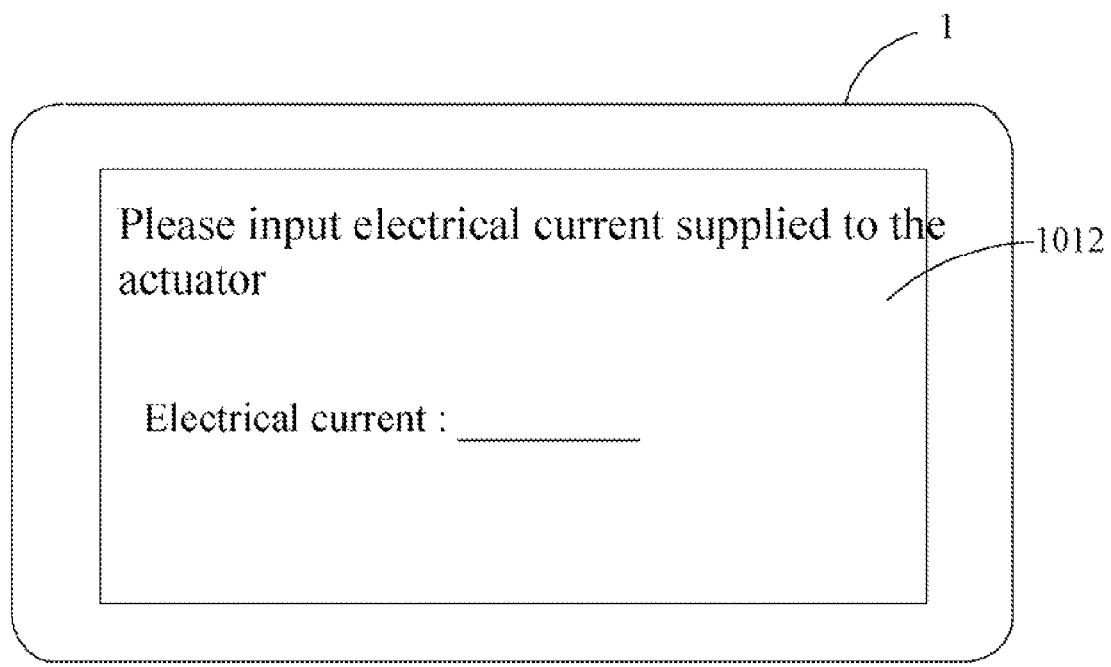
FIG. 3 is a schematic view of an input interface provided by the image capturing device of FIG. 1, to invite the input of control data.

The interface control module 101 displays an input interface for a user to input control data for controlling autofocus function. The control data may be the electrical current supplied to the actuator 40, an autofocus position to which the lens 10 is to be moved, or a movement trajectory for the lens 10 to follow. In this embodiment, the interface control module 101 first displays a selecting interface for the user to select which control data is to be input. In this embodiment, the selecting interface includes an electrical current option, an autofocus position option, and a movement trajectory option. When one option is selected, a sub-interface for inputting control data corresponding to the selected option is displayed. As shown in FIGS. 2-3, when the electrical current option in the selecting interface 1011 is selected, the sub-interface 1012 for inputting the electrical current to be supplied to the actuator 40 is displayed.

The drive control module 102 controls the actuator 40 to move the lens 10 according to the input control data. In the embodiment, when the level of electrical current to be supplied to the actuator 40 is input, the drive control module 102 controls the actuator 40 to move the lens 10 with a force generated according to the level of the electrical current. When an autofocus position is input, the drive control module 102 controls the actuator 40 to move the lens 10 to reach an autofocus position. When the movement trajectory is input, the drive control module 102 controls the actuator 40 to move the lens 10 along the movement trajectory.

The determining module 103 determines an actual position of the lens 10 after the lens 10 has been moved into an autofocus position. In the embodiment, the actual position so determined is the result of an average autofocus position calculated according to a variety of autofocus positions of the lens 10. That is, the determining module 103 determines an actual position each time the lens 10 has been moved to an autofocus position. Then, the determining module 103 calculates an average position from the variety of actual positions to determine the actual position representing autofocus. In the embodiment, the image capturing device 1 further includes a position sensor 50. The position sensor 50 outputs different voltages when the lens 10 is in different positions. Different voltages correspond to different positions. The determining module 103 obtains the voltage value from the position sensor 50, and then determines the position of the lens 10 corresponding to the obtained voltage value.

The analyzing module 104 calculates a theoretical autofocus position of the lens 10 according to the input control data. In many instances, the actual position of the lens 10 may not be the theoretical autofocus position even though selected by the autofocus function of the image capture device 1. The analyzing module 104 then determines a ratio between the determined actual position of the lens 10 and the theoretical autofocus position as a correction coefficient.

After the correction coefficient has been set, when in use, the input control data is firstly modified according to the correction coefficient. The drive control module 102 then controls the actuator 40 to move the lens 10 according to the corrected control data. As the control data is modified according to the correction coefficient, when in use, the lens 10 is moved to a modified autofocus position according to the corrected control data.

Figure 4:
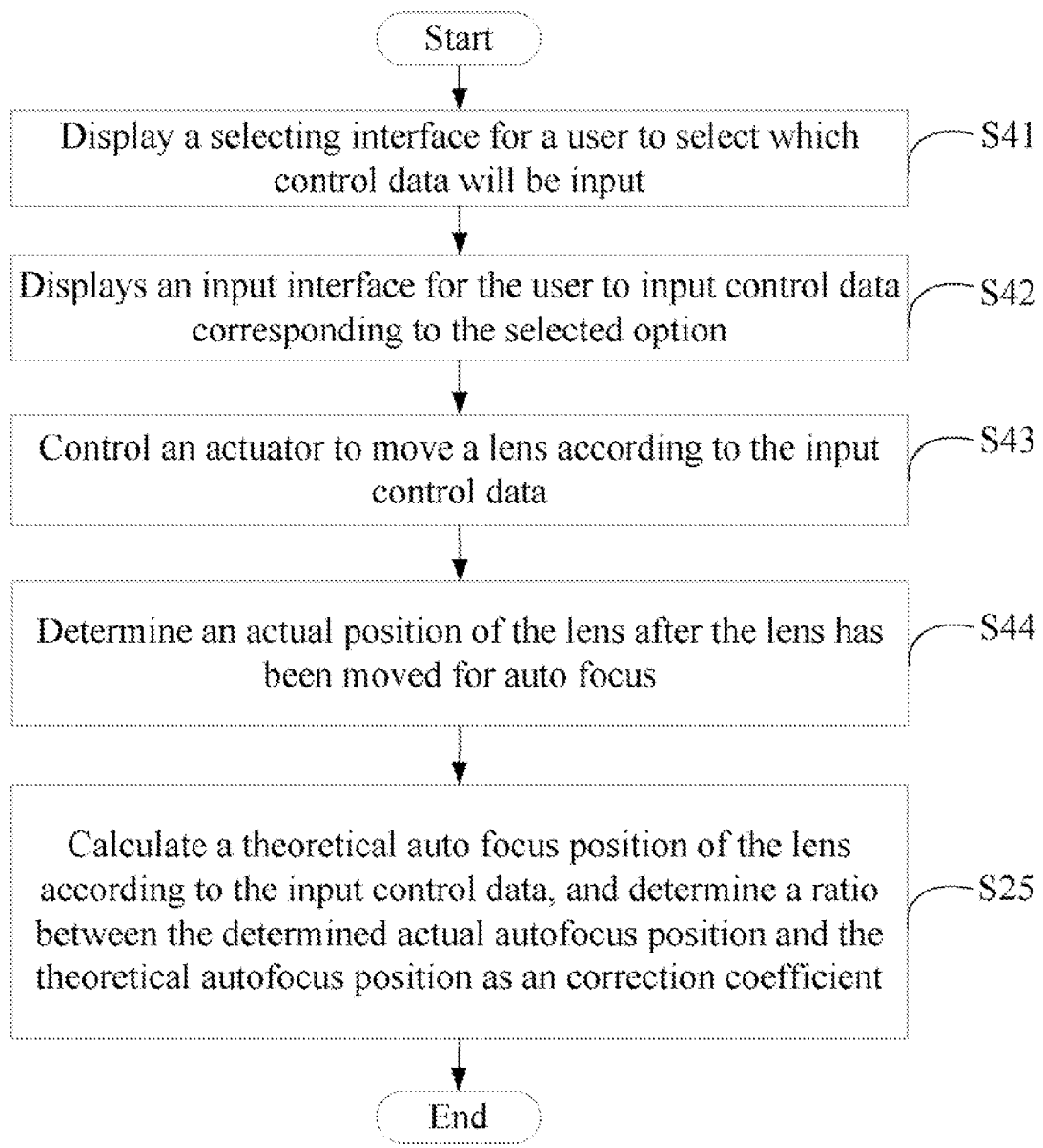
FIG. 4 is a flowchart of a method for determining a correction coefficient of autofocus function, in accordance with an exemplary embodiment.

FIG. 4 is a flowchart of a method for determining a correction coefficient for autofocus function, in accordance with an exemplary embodiment.

In step S41, the interface control module 101 first displays a selecting interface for a user to select which control data will be input. In this embodiment, the selecting interface includes an electrical current option, an autofocus position option, and a movement trajectory option.

In step S42, the interface control module 101 then displays a sub-interface for the user to input control data for controlling autofocus corresponding to the selected option. The control data may be the level of electrical current supplied to the actuator 40, an autofocus position to which the lens 10 is to be moved, or a movement trajectory along which the lens 10 is to be moved.

In step S43, the drive control module 102 controls the actuator 40 to move the lens 10 according to the input control data. In the embodiment, when the level of electrical current to be supplied to the actuator 40 is input, the drive control module 102 controls the actuator 40 to move the lens 10 with a force generated according to the input level of electrical current. When an autofocus position is input, the drive control module 102 controls the actuator 40 to move the lens 10 to the autofocus position. When the movement trajectory is input, the drive control module 102 controls the actuator 40 to move the lens 10 along the movement trajectory.

In step S44, the determining module 103 determines an actual position of the lens 10 after the lens 10 has been moved for autofocus. In the embodiment, the actual position is an average autofocus position calculated according to a variety of autofocus positions of the lens 10.

In step S45, the analyzing module 104 calculates a theoretical autofocus position of the lens 10 according to the input control data, and then determines a ratio between the determined actual position of the lens 10 and the theoretical autofocus position as a correction coefficient.

After the correction coefficient has been set, when in use, the input control data is firstly modified according to the correction coefficient after the control data is input. The drive control module 102 then controls the actuator 40 to move the lens 10 according to the corrected control data. As the control data is corrected according to the correction coefficient, when in use, the lens 10 is moved to a modified autofocus position according to the corrected control data.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An image capturing device comprising:
   a lens;
   an actuator to move the lens;
   a storage unit storing a plurality of modules; and
   a processor to execute the plurality of modules,
   wherein the plurality of modules comprises:
      an interface control module to display an input interface for a user to input control data for controlling autofocus function;
      a drive control module to control the actuator to move the lens according to the input control data;
      a determining module to determine an actual position of the lens after the lens has been moved for autofocus; and
      an analyzing module to calculate a theoretical autofocus position of the lens according to the input control data, and determine a ratio between the determined actual position and the theoretical autofocus position as a correction coefficient;
   wherein when in use, after the correction coefficient has been set, the input control data is firstly modified according to the correction coefficient, and the drive control module is further configured to control the actuator to move the lens to the modified autofocus position according to the corrected control data.

2. The image capturing device of claim 1, wherein the control data is electrical current supplied to the actuator, an autofocus position to which the lens is to be moved, or a movement trajectory for the lens is to follow.

3. The image capturing device of claim 2, wherein the interface control module is configured to first display a selecting interface for the user to select which control data is to be input, and when one option is selected, the input interface for inputting control data corresponding to the selected option is displayed.

4. The image capturing device of claim 3, wherein the selecting interface comprises an electrical current option, an autofocus position option, and a movement trajectory option; when the driving current option is selected, a level of electrical current to be supplied to the actuator is input, and the drive control module is configured to control the actuator to move the lens with a force generated according to the level of the electrical current; when the autofocus position option is selected, an autofocus position is input, and the drive control module is configured to control the actuator to move the lens to an autofocus position; when the movement trajectory option is selected, a movement trajectory is input, and the drive control module is configured to control the actuator to move the lens along the movement trajectory.

5. The image capturing device of claim 1, wherein the determining module is configured to determine an actual position each time the lens has been moved to an autofocus position, and calculate an average position from a plurality of actual positions to determine the actual position representing auto-focus.

6. The image capturing device of claim 1, further comprising a position sensor, wherein the position sensor is configured to output different voltages when the lens is in different positions, and different voltages correspond to different position; the determining module is configured to obtain a voltage value from the position sensor, and determine one position of the lens corresponding to the obtained voltage value.

7. A method for determining a correction coefficient for autofocus function applied in an image capturing device, the image capturing device comprising a lens and an actuator configured to move the lens, the method comprising:
   displaying an input interface for a user to input control data for controlling autofocus function;
   controlling the actuator to move the lens according to the input control data;
   determining an actual position of the lens after the lens has been moved for autofocus;
   calculating a theoretical autofocus position of the lens according to the input control data; and
   determining a ratio between the determined actual autofocus position and the theoretical autofocus position as the correction coefficient;
   wherein when in use, after the correction coefficient has been set, the input control data is firstly modified according to the correction coefficient, and the lens is moved by the actuator to a modified autofocus position according to the corrected control data.

8. The method of claim 7, wherein the control data is electrical current supplied to the actuator, an autofocus position to which the lens is to be moved, or a movement trajectory for the lens is to follow.

9. The method of claim 7, wherein the step displaying an input interface for a user to input control data for controlling autofocus function further comprises:
   displaying a selecting interface for the user to select which control data is to be input; and
   displaying the input interface for inputting control data corresponding to one selected option.

10. The method of claim 9, wherein the selecting interface comprises an electrical current option, an autofocus position option, and a movement trajectory option; when the driving current option is selected, a level of electrical current to be supplied to the actuator is input, and the method is configured for controlling the actuator to move the lens with a force generated according to the level of the electrical current; when the autofocus position option is selected, an autofocus position is input, and the method is configured for controlling the actuator to move the lens to an autofocus position; when the movement trajectory option is selected, a movement trajectory is input, and the method is configured for controlling the actuator to move the lens along the movement trajectory.

11. The method of claim 7, wherein the step determining an actual position of the lens after the lens has been moved for autofocus further comprises:
   determining an actual position each time the lens has been moved to an autofocus position; and
   calculating an average position from a plurality of actual positions to determine the actual position representing auto-focus.

12. A non-transitory storage medium storing a plurality of modules, the plurality of modules comprising instructions executable by a processor of an image capturing device to perform a method for determining a correction coefficient for autofocus function, the image capturing device comprising a lens and an actuator configured to move the lens, the method comprising:
   displaying an input interface for a user to input control data for controlling autofocus function;
   controlling the actuator to move the lens according to the input control data;
   determining an actual position of the lens after the lens has been moved for autofocus;
   calculating a theoretical autofocus position of the lens according to the input control data; and
   determining a ratio between the determined actual autofocus position and the theoretical autofocus position as the correction coefficient;
   wherein when in use, after the correction coefficient has been set, the input control data is firstly modified according to the correction coefficient, and the lens is moved by the actuator to a modified autofocus position according to the corrected control data.

13. The non-transitory storage medium of claim 12, wherein the control data is electrical current supplied to the actuator, an autofocus position to which the lens is to be moved, or a movement trajectory for the lens is to follow.

14. The non-transitory storage medium of claim 12, wherein the step displaying an input interface for a user to input control data for controlling autofocus function further comprises:
   displaying a selecting interface for the user to select which control data is to be input; and
   displaying the input interface for inputting control data corresponding to one selected option.

15. The non-transitory storage medium of claim 13, wherein the selecting interface comprises an electrical current option, an autofocus position option, and a movement trajectory option; when the driving current option is selected, a level of electrical current to be supplied to the actuator is input, and the method is configured for controlling the actuator to move the lens with a force generated according to the level of the electrical current; when the autofocus position option is selected, an autofocus position is input, and the method is configured for controlling the actuator to move the lens to an autofocus position; when the movement trajectory option is selected, a movement trajectory is input, and the method is configured for controlling the actuator to move the lens along the movement trajectory.

16. The non-transitory storage medium of claim 12, wherein the step determining an actual position of the lens after the lens has been moved for autofocus further comprises:
   determining an actual position each time the lens has been moved to an autofocus position; and
   calculating an average position from a plurality of actual positions to determine the actual position representing auto-focus.

* * * * *